US009554068B2

United States Patent
Ohshitanai

(10) Patent No.: US 9,554,068 B2
(45) Date of Patent: Jan. 24, 2017

(54) SOLID-STATE IMAGING APPARATUS AND CAMERA

(71) Applicant: CANON KABUSHIKI KAISHA, Tokyo (JP)

(72) Inventor: Kazuki Ohshitanai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 14/549,953

(22) Filed: Nov. 21, 2014

(65) Prior Publication Data

US 2015/0163426 A1   Jun. 11, 2015

(30) Foreign Application Priority Data

Dec. 6, 2013   (JP) .................................. 2013-253612

(51) Int. Cl.
| | |
|---|---|
| H04N 3/14 | (2006.01) |
| H04N 5/335 | (2011.01) |
| H04N 5/369 | (2011.01) |
| H04N 5/378 | (2011.01) |

(52) U.S. Cl.
CPC .......... *H04N 5/3696* (2013.01); *H04N 5/3698* (2013.01); *H04N 5/378* (2013.01)

(58) Field of Classification Search
CPC ..... H04N 5/3696; H04N 5/3698; H04N 5/378
USPC ........ 348/294–324; 250/208.1; 257/290–292
See application file for complete search history.

(56) References Cited

U.S. PATENT DOCUMENTS

| 8,610,979 | B2 | 12/2013 | Sato | |
|---|---|---|---|---|
| 2011/0176042 | A1* | 7/2011 | Kato | ................. H01L 27/14609 348/294 |
| 2012/0194696 | A1 | 8/2012 | Ohshitanai et al. | |
| 2014/0036121 | A1 | 2/2014 | Minowa et al. | |
| 2014/0063305 | A1 | 3/2014 | Sato | |
| 2014/0320720 | A1 | 10/2014 | Ohshitanai | |

FOREIGN PATENT DOCUMENTS

| JP | 2004-112422 A | 4/2004 |
|---|---|---|
| JP | 2007-057677 A | 3/2007 |
| JP | 2008-058498 A | 3/2008 |
| JP | 2012-191400 A | 10/2012 |

* cited by examiner

*Primary Examiner* — Yogesh Aggarwal
(74) *Attorney, Agent, or Firm* — Fitzpatrick, Cella, Harper & Scinto

(57) ABSTRACT

A solid-state imaging apparatus is provided. The apparatus may include a plurality of pixels each including a first photoelectric conversion element and a second photoelectric conversion element, a processing circuit configured to perform a first process for generating a first signal corresponding to a charge generated by the first photoelectric conversion element, and a second process for generating a second signal corresponding to a sum of the charge generated by the first photoelectric conversion element and a charge generated by the second photoelectric conversion element, and a current source configured to supply a first driving current to the processing circuit when the processing circuit performs the first process, and supply a second driving current higher than the first driving current to the processing circuit when the processing circuit performs the second.

10 Claims, 4 Drawing Sheets

SOLID-STATE IMAGING APPARATUS AND CAMERA

BACKGROUND OF THE INVENTION

Field of the Invention

The present invention relates to a solid-state imaging apparatus and a camera.

Description of the Related Art

Japanese Patent Laid-Open No. 2012-191400 proposes a solid-state imaging apparatus for performing focus detection of a pupil division method. Each pixel of this solid-state imaging apparatus has two photoelectric conversion elements. A focus detection signal is generated based on a charge generated by one photoelectric conversion element. An image data signal is generated based on charges generated by the both photoelectric conversion elements.

SUMMARY OF THE INVENTION

A solid-state imaging apparatus proposed in Japanese Patent Laid-Open No. 2012-191400 generates both of a focus detection signal and an image data signal individually. Consequently, an operation time gets longer, and thus power consumption increases. An aspect of the present invention provides a technique for reducing the power consumption of the solid-state imaging apparatus capable of generating both of the focus detection signal and the image data signal.

According to some embodiments, a solid-state imaging apparatus is provided. The apparatus may include a plurality of pixels each including a first photoelectric conversion element and a second photoelectric conversion element, a processing circuit configured to perform a first process for generating a first signal corresponding to a charge generated by the first photoelectric conversion element, and a second process for generating a second signal corresponding to a sum of the charge generated by the first photoelectric conversion element and a charge generated by the second photoelectric conversion element, and a current source configured to supply a first driving current to the processing circuit when the processing circuit performs the first process, and supply a second driving current higher than the first driving current to the processing circuit when the processing circuit performs the second process.

Further features of the present invention will become apparent from the following description of exemplary embodiments (with reference to the attached drawings).

DESCRIPTION OF THE EMBODIMENTS

Figure 1:
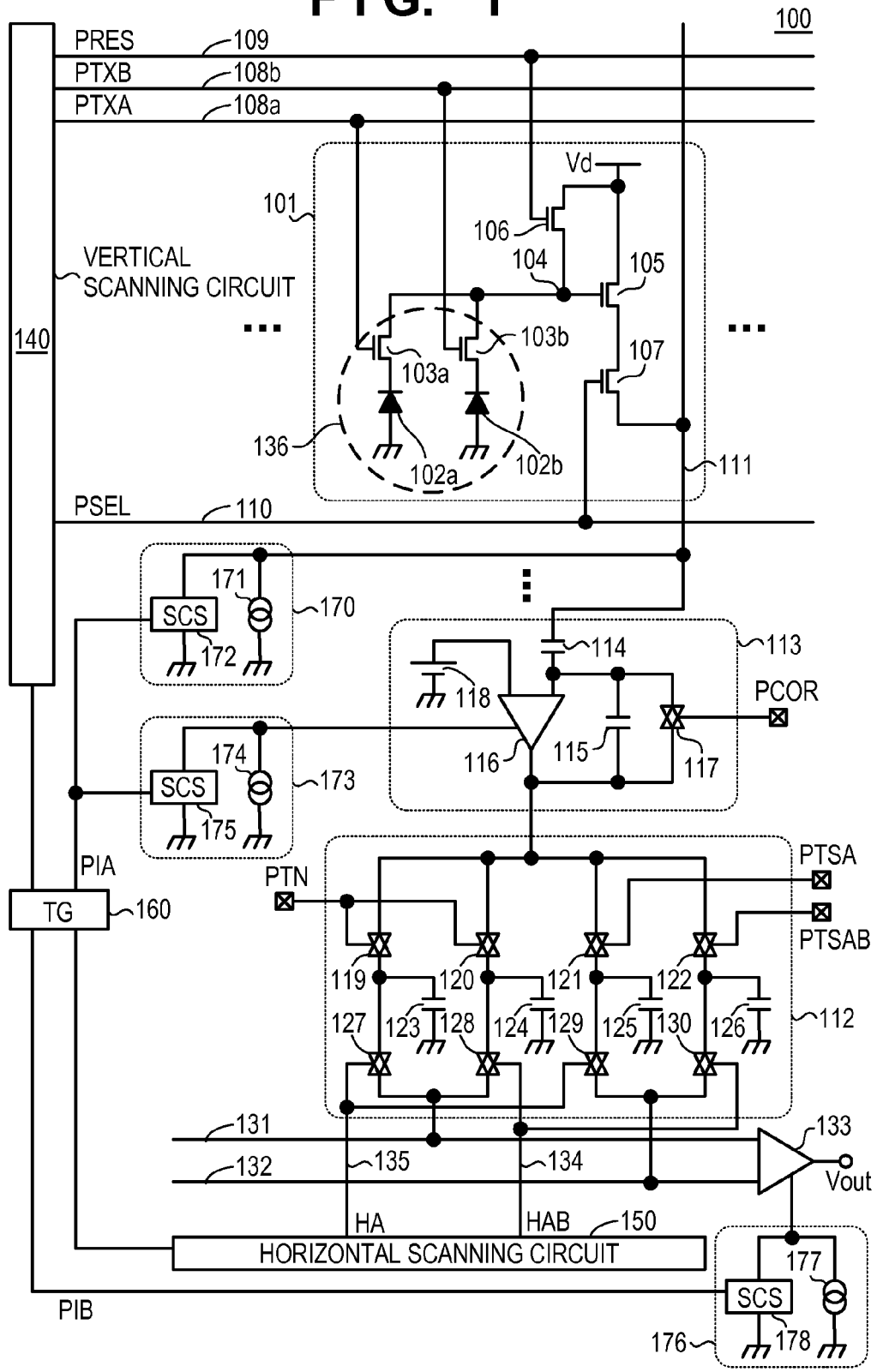
FIG. 1 is a circuit diagram of a solid-state imaging apparatus according to some embodiments.

Embodiments of the present invention will be described with reference to the accompanying drawings. The same reference numerals denote the same elements throughout various embodiments, and a repetitive description thereof will be omitted. The embodiments can appropriately be modified or combined.

An example of the circuit arrangement of a solid-state imaging apparatus 100 according to some embodiments will be described with reference to FIG. 1. The solid-state imaging apparatus 100 includes a pixel array including a plurality of pixels 101 arranged in a matrix, a column amplifier 113, a memory unit 112, a vertical scanning circuit 140, a horizontal scanning circuit 150, and a timing generator (TG) 160. Each pixel 101 generates a signal corresponding to incident light to the solid-state imaging apparatus 100. In FIG. 1, attention is paid to one of the plurality of pixels 101. The vertical scanning circuit 140 supplies a control signal to the pixel 101 in accordance with control signals from the TG 160. The column amplifier 113 amplifies the signal from the pixel 101. The memory unit 112 temporarily holds the signal from the column amplifier 113. The horizontal scanning circuit 150 supplies a control signal to the memory unit 112 in accordance with the control signals from the TG 160, thereby transferring the signal from the memory unit 112 to an output amplifier 133. The TG 160 controls the timing of overall operations in the solid-state imaging apparatus 100.

The pixel 101 includes photoelectric conversion elements 102a and 102b, transfer transistors 103a and 103b, a floating diffusion region (FD region) 104, an amplification transistor 105, a reset transistor 106, and a selection transistor 107. Each of the photoelectric conversion elements 102a and 102b generates a signal charge corresponding to the amount of irradiated light. A microlens 136 which condenses incident light is formed on the photoelectric conversion elements 102a and 102b. The microlens 136 condenses incident light such that both of the photoelectric conversion elements 102a and 102b receive the incident light. In other words, the pixel 101 includes a plurality of photoelectric conversion elements. Each photoelectric conversion element of the pixel 101 receives light emitted from a corresponding region of an exit pupil of a photographic lens.

The transfer transistor 103a transfers the signal charge generated by the photoelectric conversion element 102a to the FD region 104. A control signal PTXA is supplied from the vertical scanning circuit 140 to the gate of the transfer transistor 103a via a driving line 108a. The transfer transistor 103b transfers the signal charge generated by the photoelectric conversion element 102b to the FD region 104. A control signal PTXB is supplied from the vertical scanning circuit 140 to the gate of the transfer transistor 103b via a driving line 108b.

A charge signal is converted into a voltage signal in the FD region 104. The amplification transistor 105 amplifies and outputs this voltage signal. The reset transistor 106 resets the potential of the FD region 104 to a reset potential Vd. A control signal PRES is supplied from the vertical scanning circuit 140 to the gate of the reset transistor 106 via a driving line 109. The selection transistor 107 reads out the voltage signal from the amplification transistor 105 to a vertical output line 111. A control signal PSEL is supplied from the vertical scanning circuit 140 to the gate of the selection transistor 107 via a driving line 110. The plurality of pixels arrayed in a row direction (a horizontal direction in FIG. 1) share the driving lines 108a, 108b, 109, and 110, respectively. The plurality of pixels arrayed in a column direction (a vertical direction in FIG. 1) share the vertical output line 111. The solid-state imaging apparatus 100 includes the column amplifier 113 for each vertical output line 111. In FIG. 1, attention is paid, out of the plurality of column amplifiers 113, to the column amplifier 113 which processes the signal from the pixel 101 shown in FIG. 1. Assume that each of the transfer transistors 103a and 103b, the reset transistor 106, and the selection transistor 107 is set in a conductive state when the control signal is set at high level, and is set in a non-conductive state when the control signal is set at low level.

A variable current source 170 is connected to the vertical output line 111. The variable current source 170 supplies the driving current of a source-follower circuit formed by the amplification transistor 105. The variable current source 170 includes a constant current source 171 and a switching current source 172 connected in parallel. A control signal PIA is supplied from the TG 160 to the control terminal of the switching current source 172. The constant current source 171 consistently (that is, irrespective of the value of the control signal PIA) supplies a predetermined current to the vertical output line 111. The control signal PIA controls the on/off of the switching current source 172. The switching current source 172 is turned on when the control signal PIA is set at high level, and supplies a predetermined current to the vertical output line 111. The switching current source 172 is turned off when the control signal PIA is set at low level, and stops supplying the current to the vertical output line 111. When the control signal PIA is set at high level, the sum of the currents supplied by the constant current source 171 and the switching current source 172 is supplied to the vertical output line 111.

The signal read out to the vertical output line 111 is amplified by the column amplifier 113. The column amplifier 113 includes a clamp capacitor 114, a feedback capacitor 115, an operation amplifier 116, a switch 117, and a reference power supply 118. A variable current source 173 is connected to the operation amplifier 116, and supplies the driving current of the operation amplifier 116. The variable current source 173 includes a constant current source 174 and a switching current source 175. The arrangement of the variable current source 173 is the same as that of the variable current source 170, and a repetitive description thereof will be omitted. A control signal PCOR is supplied from the TG 160 to the control terminal of the switch 117. The switch 117 is set in a conductive state when the control signal PCOR is set at high level, and the column amplifier 113 operates as a unity gain buffer. Assuming that a voltage supplied by the reference power supply 118 is a reference voltage VCOR, each potential of two input terminals and one output terminal of the operation amplifier 116 is equal to the reference voltage VCOR. The switch 117 is set in a non-conductive state when the control signal PCOR is set at low level, and the column amplifier 113 operates as an inverting amplifier. Assuming that the clamp capacitor 114 is C0 and the feedback capacitor 115 is Cf, the gain of this inverting amplifier is C0/Cf.

The signal amplified by the column amplifier 113 is temporarily stored in the memory unit 112. The solid-state imaging apparatus 100 has the memory unit 112 for each column amplifier 113. The memory unit 112 has four capacitors 123, 124, 125, and 126, and can store four analog signals. A switch 119 is arranged between the capacitor 123 and the column amplifier 113. A control signal PTN is supplied from the TG 160 to the control terminal of the switch 119. A switch 127 is arranged between the capacitor 123 and the output amplifier 133. A control signal HA is supplied from the horizontal scanning circuit 150 to the control terminal of the switch 127. A switch 120 is arranged between the capacitor 124 and the column amplifier 113. The control signal PTN is supplied from the TG 160 to the control terminal of the switch 120. A switch 128 is arranged between the capacitor 124 and the output amplifier 133. A control signal HAB is supplied from the horizontal scanning circuit 150 to the control terminal of the switch 128. A switch 121 is arranged between the capacitor 125 and the column amplifier 113. A control signal PTSA is supplied from the TG 160 to the control terminal of the switch 121. A switch 129 is arranged between the capacitor 125 and the output amplifier 133. The control signal HA is supplied from the horizontal scanning circuit 150 to the control terminal of the switch 129. A switch 122 is arranged between the capacitor 126 and the column amplifier 113. A control signal PTSAB is supplied from the TG 160 to the control terminal of the switch 122. A switch 130 is arranged between the capacitor 126 and the output amplifier 133. The control signal HAB is supplied from the horizontal scanning circuit 150 to the control terminal of the switch 130. Assume that each of the switches 119 to 122 and 127 to 130 is set in a conductive state when the control signal is set at high level, and is set in a non-conductive state when the control signal is set at low level.

The signals held in the capacitors 123 and 124 are transferred to the output amplifier 133 via a horizontal output line 131. The signals held in the capacitors 125 and 126 are transferred to the output amplifier 133 via a horizontal output line 132. A difference between two signals transferred to the output amplifier 133 is amplified by the output amplifier 133, and output as an output signal Vout outside the solid-state imaging apparatus 100. That is, the output amplifier operates as an output circuit. A variable current source 176 is connected to the output amplifier 133, and supplies the driving current of the output amplifier 133. The variable current source 176 includes a constant current source 177 and a switching current source 178. The variable current source 173 is the same as the variable current source 170 except that the switching current source 178 is controlled by a control signal PIB supplied from the TG 160, and a repetitive description thereof will be omitted.

As described above, one pixel 101 in the solid-state imaging apparatus 100 includes two photoelectric conversion elements 102a and 102b. This allows the solid-state imaging apparatus 100 to generate both of the focus detection signal and the image data signal. These signals can be used to perform focus detection of a pupil division method. The focus detection signal is a signal corresponding to the signal charge generated by one photoelectric conversion element (for example, 102a). The image data signal is a signal corresponding to, for example, the sum of the signal charges generated by both of the photoelectric conversion elements 102a and 102b.

In the following description, the solid-state imaging apparatus 100 generates, as the focus detection signal, a signal corresponding to the signal charge generated by the photoelectric conversion element 102a. This signal is generally referred to as an A signal. The solid-state imaging apparatus 100 also generates, as the image data signal, the signal corresponding to the sum of the signal charge generated by the photoelectric conversion element 102a and the signal charge generated by the photoelectric conversion element 102b. This signal is generally referred to as an AB signal.

As will be described later, the focus detection signal has a smaller value than an image data creation signal, and does not require high accuracy. Consequently, the solid-state imaging apparatus 100 supplies, from the variable current sources 170, 173, and 176 to a processing circuit, a driving current having a smaller value in a process for generating the focus detection signal (for example, the A signal) than in a process for generating the image data signal (for example, the AB signal). In the above-described example, the processing circuit includes the amplification transistor 105, the column amplifier 113, and the output amplifier 133. The current supplied in the process for generating the focus detection signal will be referred to as a lower current, and a current supplied in the process for generating the image data signal will be referred to as a higher current, hereinafter.

Figure 2:
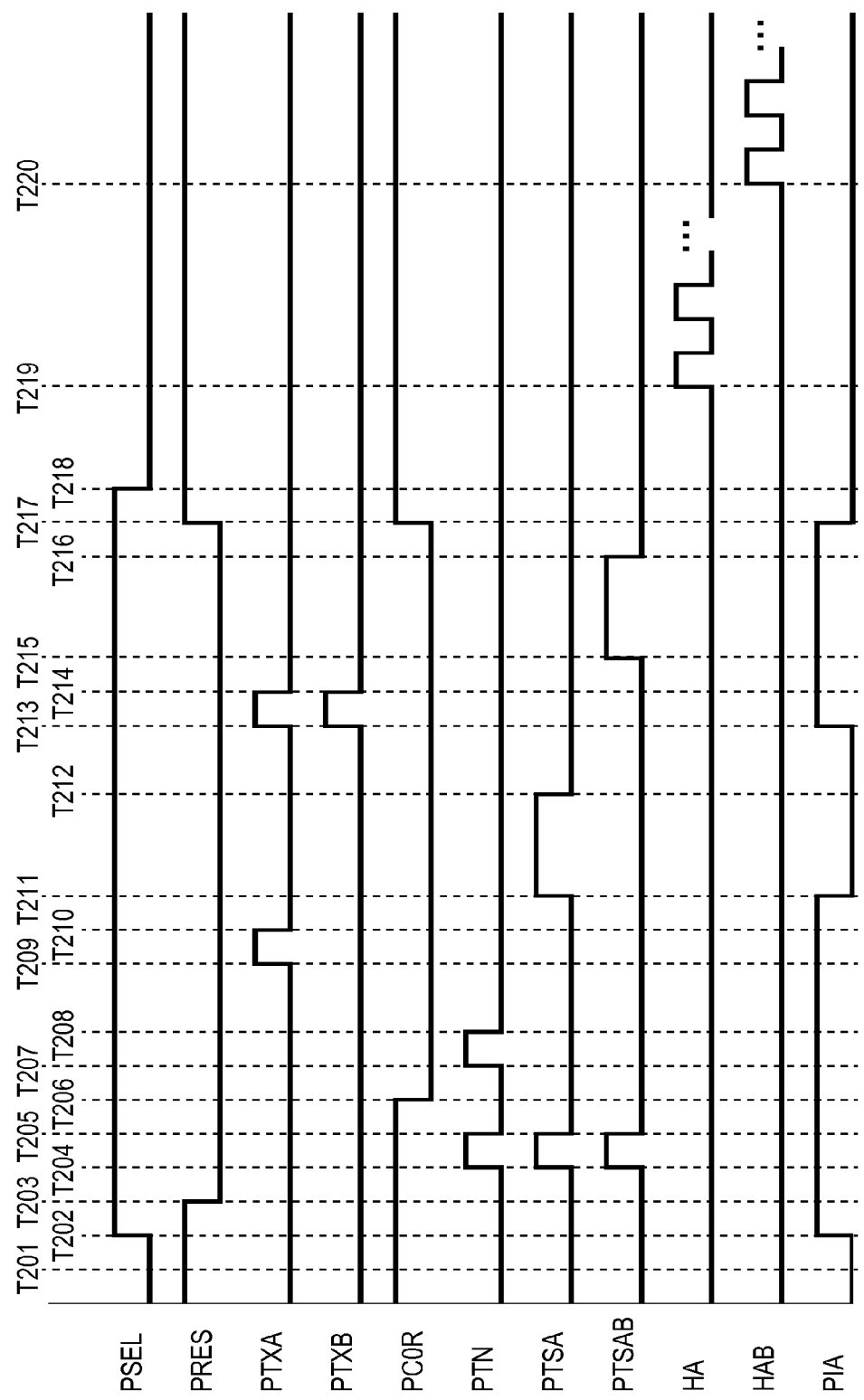
FIG. 2 is a driving timing chart of the solid-state imaging apparatus in FIG. 1.

Subsequently, an operation example of the solid-state imaging apparatus 100 in FIG. 1 will be described with reference to a driving timing chart in FIG. 2. By an operation shown below, the pixel signal on one row of the solid-state imaging apparatus 100 is output. At time T201, each of the transfer transistors 103a and 103b, and the selection transistor 107 is in the non-conductive state, and the reset transistor 106 is in a conductive state. Therefore, the FD region 104 is reset to the reset potential Vd, and the amplification transistor 105 and the vertical output line 111 are electrically disconnected from each other. The switch 117 is in the conductive state, and thus the column amplifier 113 operates as the unity gain buffer. Each of the switches 119 to 122 and 127 to 130 is in the non-conductive state. Each of the variable current sources 170, 173, and 176 supplies the lower current.

At time T202, the TG 160 switches the control signal PIA and the control signal PSEL to high level. As a result, the selection transistor 107 is switched to the conductive state, the amplification transistor 105 and the vertical output line 111 are electrically connected to each other, and the driving current is supplied from the variable current source 170 to the amplification transistor 105. This makes the amplification transistor 105 start operating as a source follower. This also makes each of the variable current sources 170 and 173 switch the driving current to supply to the higher current.

At time T203, the TG 160 switches the control signal PRES to low level. As a result, the reset transistor 106 is set in the non-conductive state, and the FD region 104 is set in a floating state.

The TG 160 switches the control signals PTN, PTSA, and PTSAB to high level at time T204, and returns them to low level at time T205. As a result, during the period from the time T204 to T205, each of the switches 119 to 122 is set in the conductive state, and the output voltage of the column amplifier is held in the capacitors 123 to 126. That is, each of the capacitors 123 to 126 is reset to the reference voltage VCOR.

At time T206, the TG 160 switches the control signal PCOR to low level. As a result, the switch 117 is set in the non-conductive state, and the column amplifier 113 starts operating as the inverting amplifier.

The TG 160 switches the control signal PTN to high level at time T207, and returns it to low level at time T208. As a result, during the period from the time T207 to T208, each of the switches 119 and 120 is set in the conductive state, and the output voltage of the column amplifier is held in the capacitors 123 and 125. This output voltage represents a signal (to be referred to as an N signal hereinafter) corresponding to a case in which the FD region 104 of the pixel 101 is in a reset state.

The TG 160 controls the vertical scanning circuit 140 to switch the control signal PTXA to high level at time T209, and return it to low level at time T210. As a result, during the period from the time T209 to T210, the transfer transistor 103a is set in the conductive state, and the signal charge accumulated in the photoelectric conversion element 102a is transferred to the FD region 104. A potential change in the FD region 104 influenced by this signal charge is amplified by the amplification transistor 105 and output to the vertical output line 111. The signal output from the pixel 101 is multiplied by the gain C0/Cf in the column amplifier 113.

The output voltage from the column amplifier 113 corresponds to the sum of the signal (the above-described A signal) corresponding to the charge generated by the photoelectric conversion element 102a and the signal (the above-described N signal) when the FD region 104 is in the reset state (the sum is to be referred to as an AN signal hereinafter).

The TG 160 switches the control signal PTSA to high level at time T211, and returns it to low level at time T212. As a result, during the period from the time T211 to T212, the switch 121 is set in the conductive state, and the output voltage from the column amplifier 113 is held in the capacitor 125. That is, the above-described AN signal is held in the capacitor 125. Also, the TG 160 switches the control signal PIA to low level at the time T211, and returns it to high level at time T213. As a result, during the period from the time T211 to T213, the lower currents are supplied from the variable current sources 170 and 173. In the example of FIG. 2, the TG 160 switches the control signal PTSA to high level at the time T211. However, the TG 160 may switch the control signal PTSA to high level between the time T208 and the time T209, and maintain it until the time T212. Also, in the example of FIG. 2, the TG 160 switches the control signal PIA to low level at the time T211. However, the TG 160 may switch the control signal PIA to low level between the time T208 and the time T209 when the reading operation of the N signal has been completed, and maintain it until the time T213. This makes it possible to further reduce power consumption.

The TG 160 controls the vertical scanning circuit 140 to switch the control signals PTXA and PTXB to high level at the time T213, and returns them to low level at time T214. As a result, during the period from the time T213 to T214, each of the transfer transistors 103a and 103b is set in the conductive state, and the signal charges accumulated in the photoelectric conversion elements 102a and 102b are transferred to the FD region 104 and added. Potential changes in the FD region 104 influenced by these signal charges are amplified by the amplification transistor 105 and output to the vertical output line 111. The signal output from the pixel 101 is multiplied by the gain C0/Cf in the column amplifier 113. The output voltage from the column amplifier 113 corresponds to the sum of the signal corresponding to the charge generated by the photoelectric conversion element 102a (the above-described A signal), the signal corresponding to the charge generated by the photoelectric conversion element 102b (to be referred to as a B signal hereinafter), and the above-described N signal (the sum is to be referred to as an ABN signal hereinafter).

The TG 160 switches the control signal PTSAB to high level at time T215, and returns it to low level at time T216. As a result, during the period from the time T215 to T216, the switch 122 is set in a conductive state, and the output voltage from the column amplifier 113 is held in the capacitor 126. That is, the above-described ABN signal is held in the capacitor 126. In the example of FIG. 2, the TG 160 switches the control signal PTSAB to high level at the time T215. However, the TG 160 may switch the control signal PTSAB to high level between the time T212 and the time T213, and maintain it until the time T216.

The TG 160 controls the vertical scanning circuit 140 to switch the control signal PRES to high level at time T217. As a result, the reset transistor 106 is set in the conductive state, and the FD region 104 is reset. The TG 160 also switches the control signal PCOR to high level at the time T217. As a result, the switch 117 is set in the conductive state, and the column amplifier 113 starts operating as the unity gain buffer.

The TG 160 controls the vertical scanning circuit 140 to switch the control signal PSEL to low level at time T218. As a result, the selection transistor 107 is set in the non-conductive state, and row selection is canceled.

When time T219 is reached, the TG 160 controls the horizontal scanning circuit 150 to switch the control signal HA supplied via a signal line 135 to high level, and then returns it to low level. As a result, each of the switches 127 and 129 is set in the conductive state, and the N signal held in the capacitor 123 is transferred to the horizontal output line 131 and the AN signal held in the capacitor 125 is transferred to the horizontal output line 132. A difference (the AN signal−the N signal) between the signals transferred to the horizontal output lines 131 and 132 is obtained by the output amplifier 133, and the A signal is output as the output signal Vout from the output amplifier 133. The TG 160 sequentially repeats this operation for each pixel column, thereby outputting the A signal of the pixel on one row.

When time T220 is reached, the TG 160 controls the horizontal scanning circuit 150 to switch the control signal HAB supplied via a signal line 134 to high level, and then returns it to low level. As a result, each of the switches 128 and 130 is set in the conductive state, and the N signal held in the capacitor 124 is transferred to the horizontal output line 131 and the ABN signal held in the capacitor 126 is transferred to the horizontal output line 132. A difference (the ABN signal−the N signal) between the signals transferred to the horizontal output lines 131 and 132 is obtained by the output amplifier 133, and the AB signal is output as the output signal Vout from the output amplifier 133. The TG 160 sequentially repeats this operation for each pixel column, thereby outputting the AB signal of the pixel on one row.

An external apparatus (for example, the signal processing unit of the camera equipped with the solid-state imaging apparatus 100) can perform focus detection using the AB signal and the A signal output from the solid-state imaging apparatus 100. The signal processing unit calculates the B signal by, for example, subtracting the A signal from the AB signal. The signal processing unit performs focus detection by comparing the A signal and the B signal.

During the period from the time T202 to T208, a process of reading out the N signal and holding it in the capacitors 123 and 124 is performed. The N signal is used to calculate the AB signal (image data signal), and thus need to be obtained at high accuracy. To cope with this, the variable current sources 170 and 173 supply the higher currents. During the period from the time T211 to T213, a process of reading out the AN signal and holding it in the capacitor 125 is performed. The AN signal is used to generate the focus detection signal, but not used to generate the image data signal. Therefore, there is no need to obtain the AN signal at high accuracy, and the variable current sources 170 and 173 supply the lower currents. During the period from the time T213 to T217, a process of reading out the ABN signal and holding it in the capacitor 126 is performed. The ABN signal is used to calculate the AB signal (image data signal), and thus needs to be obtained at high accuracy. To cope with this, the variable current sources 170 and 173 supply the higher currents. During the period from the time T219 to T220, the A signal is output from the output amplifier 133. Since the A signal need not be output at high accuracy, the variable current source 176 supplies the lower current. That is, during the period from the time T219 to T220, the control signal PIB is at low level. During the period after the time T220, the AB signal is output from the output amplifier 133. Since the AB signal needs to be output at high accuracy, the variable current source 176 supplies the higher current. That is, after the time T220, the control signal PIB is at high level. As described above, a current which flows in a period in which the N signal is read out is higher than a current which flows in a period in which the AN signal is read out. Furthermore, a current which flows in the period in which the N signal is read out may be equal to a current which flows in a period in which the ABN signal is read out. These operations can make offsets superimposed on the ABN signal and the N signal equal to each other. Hence, it becomes possible to obtain the AB signal with less noise.

The reason why each of the variable current sources 170, 173, and 176 may supply the lower current in the process for generating the focus detection signal will be described below. A time needed until the output voltage of the column amplifier 113 converges is called the settling time of the column amplifier 113. At the time T208, T212, or T216 at which the signal write ends, the output voltage of the column amplifier 113 needs to converge. When a signal having a small value is input to the column amplifier 113, a change $\Delta Vo$ in the output voltage is proportional to a change $\Delta Vi$ in an input voltage and can be given by $$\Delta Vo = (-\Delta Vi) \cdot C0/Cf \cdot (1 - \exp(-t/\tau)) \quad (1)$$

where $\tau$ is a time constant determined by the characteristic of the transistor that forms the operation amplifier 116, the current supplied to the operation amplifier 116, and a load connected to the output terminal. The column amplifier 113 is the inverting amplifier, and assume that $\Delta Vi < 0$.

When a signal having a large value is input to the column amplifier 113, the output voltage increases in accordance with the slew rate of the operation amplifier 116 independently of the input voltage, and the change $\Delta Vo$ in the output voltage can be given by $$\Delta Vo = Iss/Co \cdot t \quad (2)$$

where Iss is the current of the operation amplifier 116, and Co is the capacitor connected to the output of the operation amplifier 116. When the change in the output is fed back to the input, and a voltage difference in two input terminals of the operation amplifier 116 becomes small, the output voltage starts changing in accordance with equation (1). For this reason, according to equation (2), when the settling time is the same an operation amplifier current can be reduced by $$Iss = \Delta V \cdot Co/t$$

by reducing the output voltage by $\Delta V$. According to equation (1), the time needed until a column amplifier output falls within a certain error range $\epsilon$ is given by $$t = -\tau \cdot \ln(\epsilon/\Delta Vo(t \to \infty))$$

where $\Delta Vo(t \to \infty)$ is the voltage to which $\Delta Vo$ converges. The lower the output voltage is, the shorter the settling time of the column amplifier 113 is.

In this embodiment, the AN signal is read out from the pixel 101, and then the ABN signal is read out. Since the ABN signal is larger than the AN signal, the output amplitude of the column amplifier 113 becomes larger in the second signal readout operation. If signal amounts that can be accumulated in the photoelectric conversion element 102a and the photoelectric conversion element 102b are equal, the A signal has an output amplitude about half that of the AB signal. According to the above description, it is therefore possible to reduce the driving current supplied to the column amplifier 113 to read out the AN signal by about half the driving current to read out the ABN signal.

The image data signal is required to have high image quality with less noise and a high S/N ratio. However, the A signal serving as the focus detection signal can only have accuracy capable of performing focus detection. In general, the lower the driving current of the column amplifier 113 is, the more likely that a decrease in amplifier output voltage accuracy caused by a reduction in an open loop gain and degradation in transient response characteristics occur. Consider a case in which, for example, smear (a phenomenon in which when a bright object which requires an output equal to or larger than the saturation amplitude of an imaging element is shot, an output around the object varies in a stripe shape) occurs due to variations in a ground potential in the column amplifier 113 having a large output. In this case, if a bias current is low, it is difficult to sufficiently suppress power supply variations during a predetermined readout time. Therefore, in the process for generating the image data signal, the driving current (bias current) of the column amplifier 113 is increased. On the other hand, in the process for generating the focus detection signal, if the photoelectric conversion element is saturated, the signal amounts of the A signal and the B signal of the focus detection signal become equal to each other, and focus detection cannot be performed. In other words, when performing focus detection on the pupil division method, the focus detection signal after saturation cannot be used. It is possible to reduce the bias current to the column amplifier 113 to the extent that smear occurs in a range where focus detection can be performed.

As described above, since the solid-state imaging apparatus 100 according to this embodiment reduces the current amounts supplied by the variable current sources 170, 173, and 176 in the process for generating the focus detection signal, power consumption decreases accordingly. In the above-described solid-state imaging apparatus 100, the pixel 101 includes the selection transistor 107. In a modification of the solid-state imaging apparatus 100, the pixel 101 does not include the selection transistor 107, and selection/non-selection may be switched by switching the potential of an input node through the operation of the reset transistor 106. Furthermore, the column amplifier 113 may have a source ground amplification circuit instead of the operation amplifier 116. Also, the column amplifier 113 may include a plurality of gain stages or a combination of the gain stage and a buffer stage. Moreover, the pixel 101 may have three or more photoelectric conversion elements. In general, the solid-state imaging apparatus 100 may adopt any arrangement which can generate the focus detection signal using the first group of the plurality of photoelectric conversion elements included in the pixel 101, and the image data signal using the second group of the plurality of photoelectric conversion elements.

Figure 3:
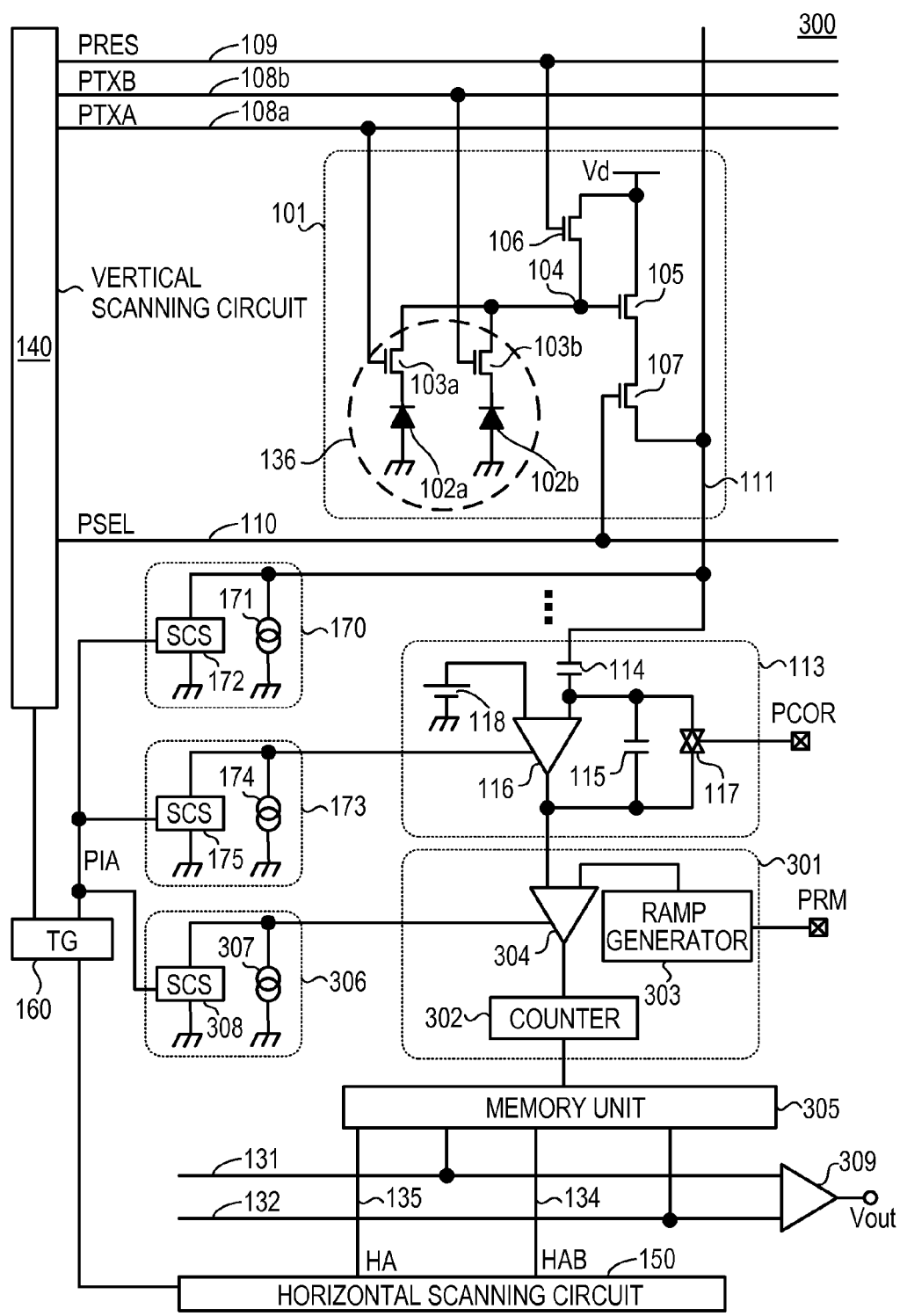
FIG. 3 is a circuit diagram of a solid-state imaging apparatus according to some other embodiments.

An example of the circuit arrangement of a solid-state imaging apparatus 300 according to some embodiments will be described with reference to FIG. 3. The solid-state imaging apparatus 300 is different from the solid-state imaging apparatus 100 in an arrangement after the column amplifier 113. The solid-state imaging apparatus 300 includes an A/D converter 301 and a memory unit 305 in correspondence with one column amplifier 113. The A/D converter 301 converts an analog signal from the column amplifier 113 into a digital signal, and holds it in the memory unit 305. The memory unit 305 can hold a plurality of digital signals.

The A/D converter 301 includes a counter 302, a ramp generator 303, and a comparator 304. The ramp generator 303 supplies a ramp signal to the first input terminal of the comparator 304 while a control signal PRM supplied from the TG 160 is at high level. The comparator 304 compares a signal from the column amplifier 113 and the ramp signal from the ramp generator 303, and supplies a comparison signal to the counter 302 at a time point when a magnitude relationship is reversed. The counter 302 holds, in the memory unit 305, a count value at a time point when the signal from the comparator 304 is received. A variable current source 306 is connected to the comparator 304, and supplies the driving current of the comparator 304. The variable current source 306 includes a constant current source 307 and a switching current source 308. The arrangement of the variable current source 306 is similar to that of the variable current source 170, and a repetitive description thereof will be omitted.

Figure 4:
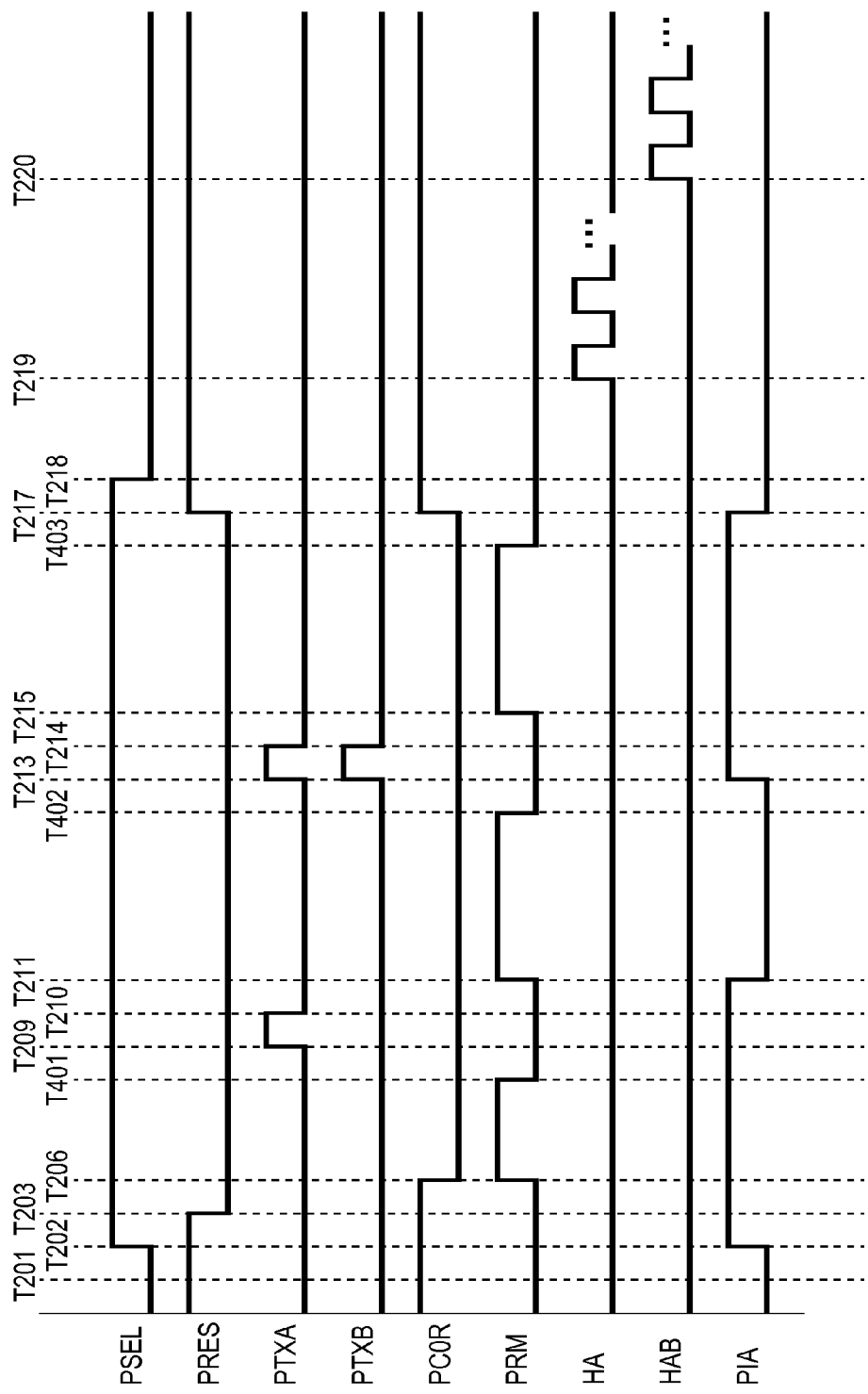
FIG. 4 is a driving timing chart of the solid-state imaging apparatus in FIG. 3.

Subsequently, an operation example of the solid-state imaging apparatus 300 in FIG. 3 will be described with reference to a driving timing chart in FIG. 4. By the following operation, the pixel signal on one row of the solid-state imaging apparatus 300 is output. The operations of the pixel 101 and the column amplifier 113 are the same as the operation that has been described with reference to the driving timing chart in FIG. 2, and a repetitive description thereof will be omitted. During the period from the time T206 to time T401, the TG 160 maintains the control signal PRM at high level. During this period, the A/D converter 301 A/D-converts the N signal output from the column amplifier 113, and stores it in the memory unit 305. As described above, the N signal is used to generate the image data signal. Accordingly, the variable current source 306 supplies the higher current to the comparator 304 so that the A/D converter 301 can perform A/D conversion at high accuracy.

During the period from the time T211 to time T402, the TG 160 maintains the control signal PRM at high level. During this period, the A/D converter 301 A/D-converts the AN signal output from the column amplifier 113, and stores it in the memory unit 305. As described above, the AN signal is used to only generate the focus detection signal. Accordingly, the variable current source 306 supplies the lower current to the comparator 304, thereby keeping the A/D conversion accuracy of the A/D converter 301 low and suppressing power consumption. In the example of FIG. 4, the TG 160 switches the control signal PIA to low level at the time T211. However, the TG 160 may switch the control signal PIA to low level between the time T401 and the time T209 when the reading operation of the N signal has been completed, and maintain it until the time T213. This makes it possible to further reduce power consumption.

During the period from the time T215 to time T403, the TG 160 maintains the control signal PRM at high level. During this period, the A/D converter 301 A/D-converts the ABN signal output from the column amplifier 113, and stores it in the memory unit 305. As described above, the ABN signal is used to generate the image data signal. Accordingly, the variable current source 306 supplies the higher current to the comparator 304 so that the A/D converter 301 can perform A/D conversion at high accuracy.

When the time T219 is reached, the TG 160 controls the horizontal scanning circuit 150 to switch the control signal HA supplied via the signal line 135 to high level, and then returns it to low level. As a result, the memory unit 305 transfers the held N signal to the horizontal output line 131 and the held AN signal to the horizontal output line 132. A difference (the AN signal–the N signal) between the signals transferred to the horizontal output lines 131 and 132 is obtained by a difference circuit 309, and the A signal serving as the digital signal is output as the output signal Vout from the difference circuit 309. That is, the difference circuit operates as the output circuit. The TG 160 sequentially repeats this operation for each pixel column, thereby outputting the A signal of the pixel on one row.

When the time T220 is reached, the TG 160 controls the horizontal scanning circuit 150 to switch the control signal HAB supplied via the signal line 134 to high level, and then returns it to low level. As a result, the memory unit 305 transfers the held N signal to the horizontal output line 131 and the held ABN signal to the horizontal output line 132. A difference (the ABN signal–the N signal) between the signals transferred to the horizontal output lines 131 and 132 is obtained by the difference circuit 309, and the AB signal serving as the digital signal is output as the output signal Vout from the difference circuit 309. The TG 160 sequentially repeats this operation for each pixel column, thereby outputting the AB signal of the pixel on one row.

As an application of the solid-state imaging apparatus according to the above-described embodiments, a camera in which the solid-state imaging apparatus is assembled will be exemplarily explained below. The concept of the camera includes not only an apparatus mainly aiming at image capturing but also an apparatus (for example, a personal computer or a portable terminal) accessorily having an image capturing function. The camera includes the solid-state imaging apparatus according to the present invention exemplified as the above-described embodiments, and a signal processing unit which processes a signal output from the solid-state imaging apparatus. The signal processing unit can include, for example, an A/D converter and a processor which processes digital data output from the A/D converter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-253612, filed Dec. 6, 2013, which is hereby incorporated by reference herein in its entirety.

What is claimed is:

1. A solid-state imaging apparatus comprising:
a plurality of pixels each including a first photoelectric conversion element, a second photoelectric conversion element, and a microlens shared by the first and second photoelectric conversion elements;
a processing circuit configured to perform a first process for generating a first signal corresponding to a charge generated by the first photoelectric conversion element, and a second process for generating a second signal corresponding to a sum of the charge generated by the first photoelectric conversion element and a charge generated by the second photoelectric conversion element; and
a current source configured to supply a first driving current to the processing circuit during a period in which the processing circuit performs the first process, and supply a second driving current to the processing circuit during a period in which the processing circuit performs the second process, a value of the second driving current being larger than a value of the first driving current.

2. The apparatus according to claim 1, wherein the first signal is used to perform focus detection, and the second signal is used to generate image data.

3. The apparatus according to claim 1, wherein the current source includes a constant current source and a switching current source connected in parallel, and
the switching current source stops supplying a current during a period in which the current source supplies the first driving current, and the switching current source supplies a current during a period in which the current source supplies the second driving current.

4. The apparatus according to claim 1, wherein each of the pixels includes an amplification transistor configured to amplify the charge generated by the first photoelectric conversion element and the charge generated by the second photoelectric conversion element, and
each of the first driving current and the second driving current includes a current for operating the amplification transistor as a source follower.

5. The apparatus according to claim 1, wherein the processing circuit includes an amplification circuit which is shared by two or more of the plurality of pixels and configured to amplify signals from the two or more pixels, and
each of the first driving current and the second driving current includes a current for driving the amplification circuit.

6. The apparatus according to claim 1, wherein each of the pixels includes a floating diffusion region connected to the first photoelectric conversion element and the second photoelectric conversion element,
the processing circuit further performs a third process for generating a third signal corresponding to a potential of the floating diffusion region in a reset state,
the current source supplies a third driving current to the processing circuit during a period in which the processing circuit performs the third process, and
a value of the third driving current is larger than a value of the first driving current.

7. The apparatus according to claim 6, wherein the third driving current is equal to the second driving current.

8. The apparatus according to claim 7, wherein the processing circuit includes an output circuit configured to output, as the first signal, a difference between the third signal and a signal corresponding to the potential of the floating diffusion region in a state in which a charge of the first photoelectric conversion element is transferred, and output, as the second signal, a difference between the third signal and a signal corresponding to the potential of the floating diffusion region in a state in which the charge of the first photoelectric conversion element and a charge of the second photoelectric conversion element are transferred, and
each of the first driving current and the second driving current includes a current for driving the output circuit.

9. The apparatus according to claim 1, wherein the processing circuit includes an A/D converter configured to A/D-convert the first signal and the second signal, and
each of the first driving current and the second driving current includes a current for driving the A/D converter.

10. A camera comprising:
a solid-state imaging apparatus; and
a signal processing unit configured to process a signal obtained by the solid-state imaging apparatus,
wherein the solid-state imaging apparatus comprises:
a plurality of pixels each including a first photoelectric conversion element, a second photoelectric conversion element, and a microlens shared by the first and second photoelectric conversion elements;
a processing circuit configured to perform a first process for generating a first signal corresponding to a charge generated by the first photoelectric conversion element, and a second process for generating a second signal corresponding to a sum of the charge generated by the first photoelectric conversion element and a charge generated by the second photoelectric conversion element; and a current source configured to supply a first driving current to the processing circuit during a period in which the processing circuit performs the first process, and supply a second driving current to the processing circuit during a period in which the processing circuit performs the second process, a value of the second driving current being larger than a value of the first driving current.

* * * * *